US007907610B2

(12) United States Patent
Rijpkema et al.

(10) Patent No.: US 7,907,610 B2
(45) Date of Patent: Mar. 15, 2011

(54) INTEGRATED CIRCUIT WITH INTERNAL COMMUNICATION NETWORK

(75) Inventors: Edwin Rijpkema, Nieuwerkerk a/d Ijssel (NL); John Dielissen, Weert (NL)

(73) Assignee: NXP B.V., Eindhoven (NL)

( * ) Notice: Subject to any disclaimer, the term of this patent is extended or adjusted under 35 U.S.C. 154(b) by 336 days.

(21) Appl. No.: 11/915,285

(22) PCT Filed: May 17, 2006

(86) PCT No.: PCT/IB2006/051555
§ 371 (c)(1),
(2), (4) Date: Aug. 14, 2008

(87) PCT Pub. No.: WO2006/126142
PCT Pub. Date: Nov. 30, 2006

(65) Prior Publication Data
US 2009/0059910 A1 Mar. 5, 2009

(30) Foreign Application Priority Data

May 23, 2005 (EP) ..................................... 05104347

(51) Int. Cl.
*H04L 12/28* (2006.01)

(52) U.S. Cl. ........ 370/389; 370/235; 370/351; 370/400; 370/412; 370/466; 709/105; 709/200; 709/235; 709/321; 709/215

(58) Field of Classification Search .................. 370/235, 370/351, 389, 400, 401, 410, 412, 428, 466; 709/105, 200, 235, 321, 212, 213, 214, 215
See application file for complete search history.

(56) References Cited

U.S. PATENT DOCUMENTS 6,721,806 B2 * 4/2004 Boyd et al. ..................... 719/312

(Continued)

FOREIGN PATENT DOCUMENTS

EP        1320223 A2      6/2003

(Continued)

OTHER PUBLICATIONS

Bolotin, E; et al "QNOC: QOS Architechture and Design Process for Network on Chip" Journal of Systems Architechture, Elsevier Science Publishers BV., Amsterdam, NL, vol. 50, No. 2-3, Feb. 2004, pp. 105-128.

(Continued)

*Primary Examiner* — Salman Ahmed
*Assistant Examiner* — Andrew C Lee

(57) ABSTRACT

An integrated circuit comprises a plurality of data processing circuits (10) and a communication network (12) coupled between the data processing circuits (10). The communication network (12) comprises connections (122) and router circuits (120) coupled between the connections (122). Memory is provided to store definitions for respective data streams, of respective paths along the connections (122), for controlling the router circuits (120) to transmit each data item from each respective data stream along the respective path programmed for that respective data stream. Initially initial paths for a set of original data streams are defined and started. Subsequently an additional data stream can be added. If so a new path is selected in combination with future paths for the original data streams. The combination of the new paths and the future paths is taken from selectable combinations that include at least one combination wherein an initial path for at least one of the original data streams has been rerouted with respect to the initial path. The initial path for the at least one of the original data streams is reprogrammed if the path for that original data stream is rerouted in the selected combination, without interrupting transmission of data items of data streams other than the at least one of the original data streams. Subsequently transmission of data items is started along the new path.

18 Claims, 5 Drawing Sheets

U.S. PATENT DOCUMENTS

| | | | |
|---|---|---|---|
| 6,744,772 B1* | 6/2004 | Eneboe et al. | 370/400 |
| 6,757,282 B1* | 6/2004 | Ofek | 370/389 |
| 7,124,241 B1* | 10/2006 | Reeve et al. | 711/110 |
| 7,150,021 B1* | 12/2006 | Vajjhala et al. | 718/104 |
| 7,164,656 B2* | 1/2007 | Foster et al. | 370/235 |
| 7,272,309 B1* | 9/2007 | Tamil et al. | 398/47 |
| 7,620,048 B2* | 11/2009 | Bass et al. | 370/392 |
| 2005/0271073 A1* | 12/2005 | Johnsen et al. | 370/428 |
| 2006/0146808 A1* | 7/2006 | Campini et al. | 370/360 |
| 2007/0263618 A1* | 11/2007 | Ornes et al. | 370/386 |

FOREIGN PATENT DOCUMENTS

WO      2005033899 A2      4/2005

OTHER PUBLICATIONS

Ye, T. T; et al "Packetization and Routing Analysis of On-Chip Multiprocessor Networks" Journal of Systems Architechture, Elsevier Science Publishers BV., Amsterdam, NL, vol. 50, No. , 2004, pp. 81-104.

* cited by examiner

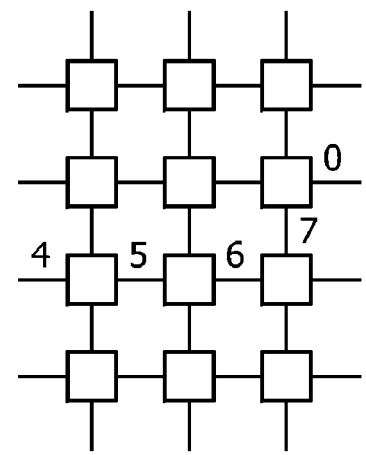
FIG. 5a
FIG. 5b
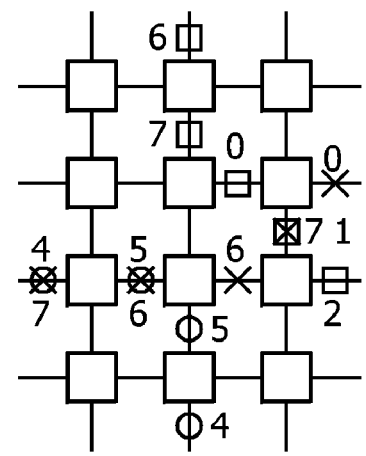
FIG. 5c
FIG. 5d

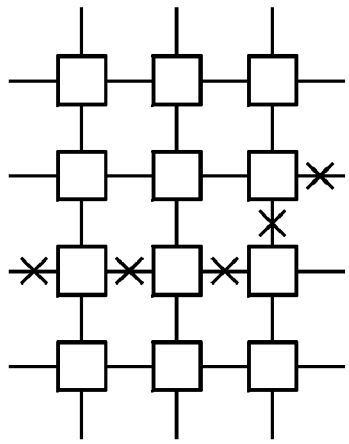
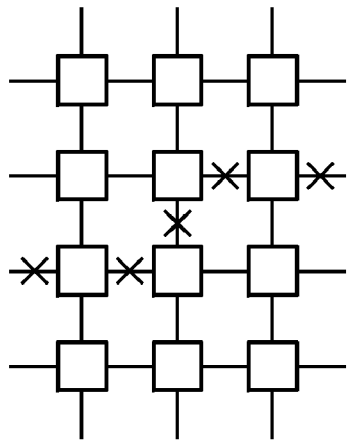
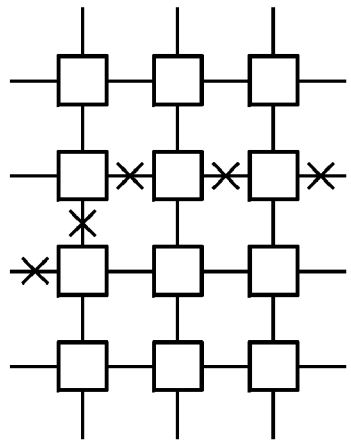
FIG. 6a FIG. 6b FIG. 6c
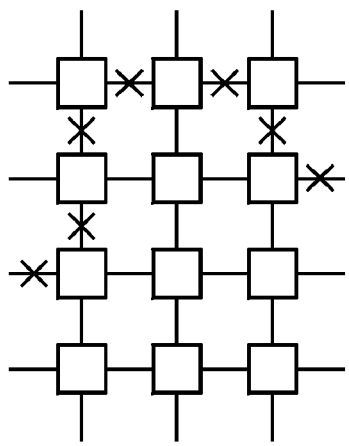
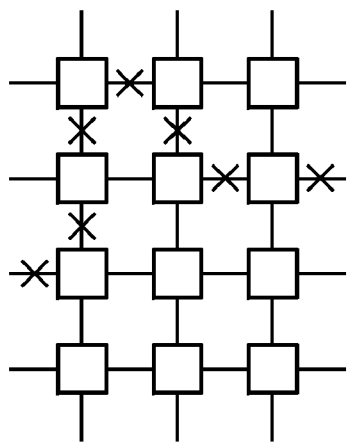
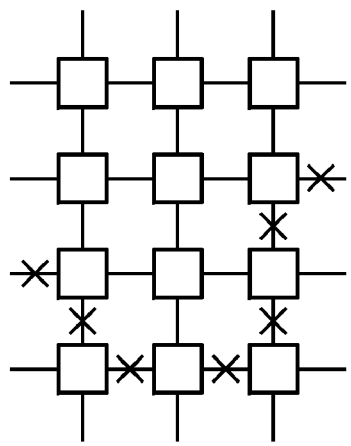
FIG. 7a FIG. 7b FIG. 7c

INTEGRATED CIRCUIT WITH INTERNAL COMMUNICATION NETWORK

The invention relates to an integrated circuit that comprises a plurality of data processing circuits and a communication network that interconnects the data processing circuits.

The use of an on-chip communication network between data processing circuits is described in an article titled "Packetization and routing analysis of on-chip multiprocessor networks", by Terry Tao Ye, Luca Benini and Giovanni de Micheli and published in the Journal of Systems Architecture 50 (2004) pages 81-104.

Such a "network-on-a-chip" makes it possible to select any one of a plurality of possible routes through the network for passing information between a pair of processing circuits. Thus, the pair of processing circuits will be able to communicate even if one possible communication route is occupied for communication between another pair of processing circuit. In addition, time slot multiplexing can be used to realize routes between different pairs of processing circuits through the same part of the network.

Routing control circuitry is required to select the route that will be used to pass information through the network. Various selection techniques can be used. Terry Tao Ye et al. (cited in the preceding), for example, propose a "contention-lookahead" technique, wherein local router circuits in the network decide about the routes based on information from neighboring routers so that the route avoids very busy router circuits. The router circuits attempt to realize the shortest possible overall transmission time, sending information along a detour if this will help to avoid long buffer delay at a very busy router. This technique adapts itself dynamically to network load, but it cannot guarantee that real time requirements will be met. Moreover, this technique requires quite complex local router circuits.

The design of networks-on-a-chip is also described in an article titled "QnoC": QoS architecture and design process for network on a chip", by Evgeny Bolotin, Israel Cidob, Ran Ginosar and Avinoam Kolodny and published in the Journal of Systems Architecture 50 (2004) 105-128. This article describes that it is desirable to ensure real time transmission over the network, i.e. transmission that is guaranteed never to require more than a predetermined amount of time. This is necessary for example for rendering video and/or audio data. This document proposes to adapt the number of router circuits and the bandwidth provided between selected routers in the design stage of the integrated circuit, so that the transmission requirements can be met for the application for which the integrated circuit is designed. Simple routers are used that decide locally on the route, selecting the shortest route from source to destination as a function of the X,Y coordinates of the router and the destination in the network.

Although this technique ensures that real time requirements will be met, it does so at the expense of circuit overhead and flexibility.

Among others, it is an object of the invention to provide for an integrated circuit with a network on a chip, wherein real-time streams of packets can be transmitted while requiring a minimum of circuit overhead.

Among others, it is an alternative object of the invention to provide for an integrated circuit with a network on a chip, wherein new real-time streams of packets can be started and routed through the network without violating real-time guarantees for existing streams.

The invention provides for an integrated circuit according to Claim 1. The integrated circuit provides for programmable paths for respective data streams, so that each data item that is transmitted through the on-chip network for a data stream is transmitted along the programmed path for that data stream. According to the invention a scheduling circuit is provided for servicing a request for adding an additional data stream to a plurality of original data streams after transmission of the original data streams has started. At least if no suitable new path can be found, the scheduling circuit reroutes the path or paths for at least one of the original data streams to vacate connections for the new path. Preferably, the rerouted path is selected under the constraint that a throughput requirement remains met, i.e. that any delay caused by rerouting is less than a maximum imposed by the throughput requirement. The scheduling circuit reprograms the rerouted path and programs the new path without interrupting transmission of data items for other data streams.

Typically, the original data streams occupy the connections in the paths in a periodically repeating pattern of slots. In this case the use of the slots in the pattern is left uninterrupted for the other data streams. To meet the throughput requirement in this case, the path length of the rerouted path and the time slot in which data is send along the rerouted path are preferably selected under the constraint that a change in length of the path due to rerouting plus any slot offset due to reslotting, between first transmission in the new slot and first non transmission according to the slot for the original route, does not exceed a maximum changeover delay value defined by the throughput requirement.

Preferably the scheduling circuit is arranged to reroute no more than one of the original paths. This simplifies rerouting. Also preferably, the scheduling circuit performs a search wherein respective combinations of paths for the data streams are visited and it is determined whether the visited combinations involve colliding use of connections, until a combination with no colliding use is detected. This is an effective way of identifying possible paths.

In various embodiments various restrictions are imposed on the rerouted paths that the scheduling circuit is able to select, so as to avoid that rerouting will lead to out of order delivery of data items from the streams. In one embodiment, the rerouted path always has the same length as the initial path. In another embodiment the rerouted path always has the same length or is longer than the initial path. In other embodiments, wherein the rerouted path may be shorter than the initial path, the slots in which data items are transmitted along the rerouted path are also changed with respect to the initial path, so as to prevent out of order delivery, or transmission in selected slots is skipped for this purpose.

The invention also relates to a method of operating an integrated circuit and to a computer program product, such as a computer readable disk with a program stored thereon, an electronic memory containing such a program or a computer readable download signal for programming the scheduling circuit to perform according to the invention.

These and other objects and advantageous aspects of the invention will be described using examples of embodiments illustrated in the accompanying Figs.

FIGS. 5a-d show occupation of connections and slots

FIGS. 6a-c show possible paths

FIGS. 7a-c show further possible paths

Figure 1:
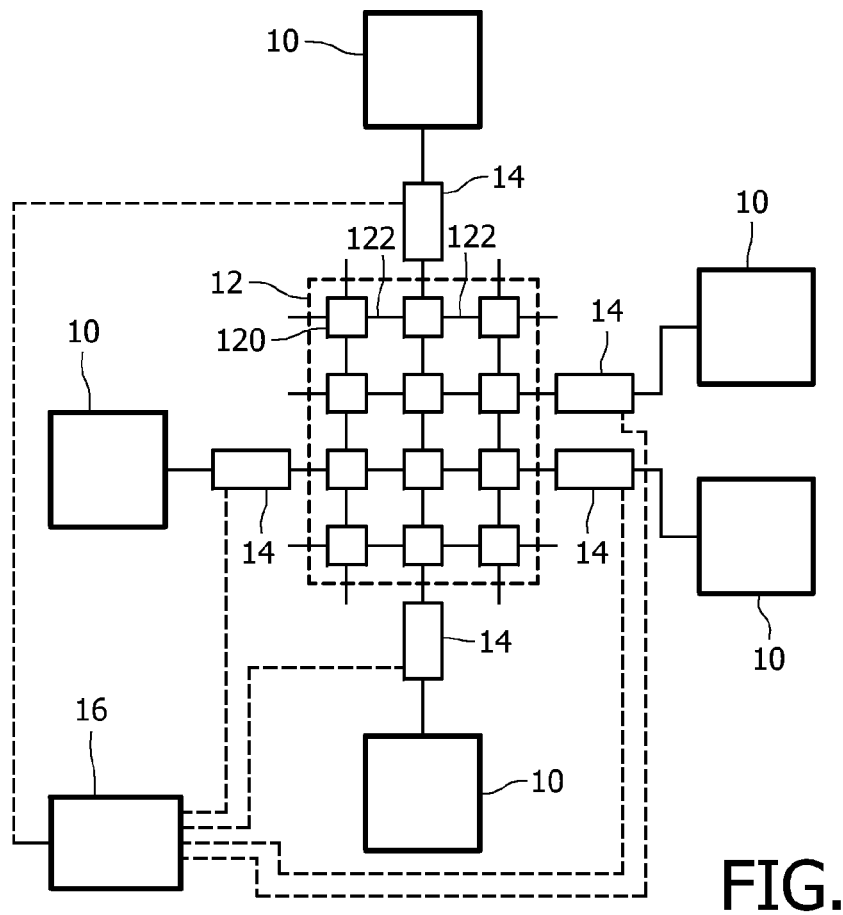
FIG. 1 shows a data processing system on an integrated circuit

FIG. 1 shows a data processing system on an integrated circuit. The data processing system comprises data processing circuits 10, a network 12, network interfaces 14 and a scheduling circuit 16. Network 12 comprises router circuits 120 and connections 122 between router circuits 120. By way of example router circuits 120 are shown interconnected in a grid configuration, wherein each router circuit 120 is connected to neighboring router circuits 120 (not all shown) in the grid. It should be realized that the invention is not limited to this grid configuration, or to the number of router circuits 120 that is shown. Other configurations may be used and/or router circuits 120 with other numbers of connections to other router circuits 120.

Some of router circuits 120 are connected to respective network interfaces 14, which in turn are coupled to data processing circuits 10. Data processing circuits 10 may be of any type, such as computing circuits (e.g. digital signal processor circuits) with local memory, or memory circuits that received addresses and data to write data at addressed locations or to receive addresses and read and return data from those addresses, or data input circuits or data output circuits of the system etc. Network interfaces 14 are coupled to scheduling circuit 16. Although direct connections are shown between network interfaces 14 and scheduling circuit 16, it should be realized that any connection may be used, for example a communication bus or even connections via network 12.

In operation data processing circuits 10 produce data streams and supply these data streams to their corresponding network interfaces 14. The network interfaces 14 forms a series of network data items from the data streams and feed these data items to the router circuits 120. Router circuits 120 pass the data items along selected paths of connections 122 through network 12 until they reach the network interface 14 of the data processing circuit 10 that is the destination of the data stream.

Network interfaces 14 insert routing information into each data item for controlling the path along which router circuits 120 will pass the data item. The content of the routing information is controlled by scheduling circuit 16. When a network interface 14 receives a signal from its associated data processing circuit 10 that a data stream should start, the network interface 14 sends a request to scheduling circuit 16 to allocate a route and/or time-slot for the transmitting data items through network 12 for communicating the stream. In return scheduling circuit 16 returns routing information that network interfaces 14 will use to route the data items.

Figure 2:
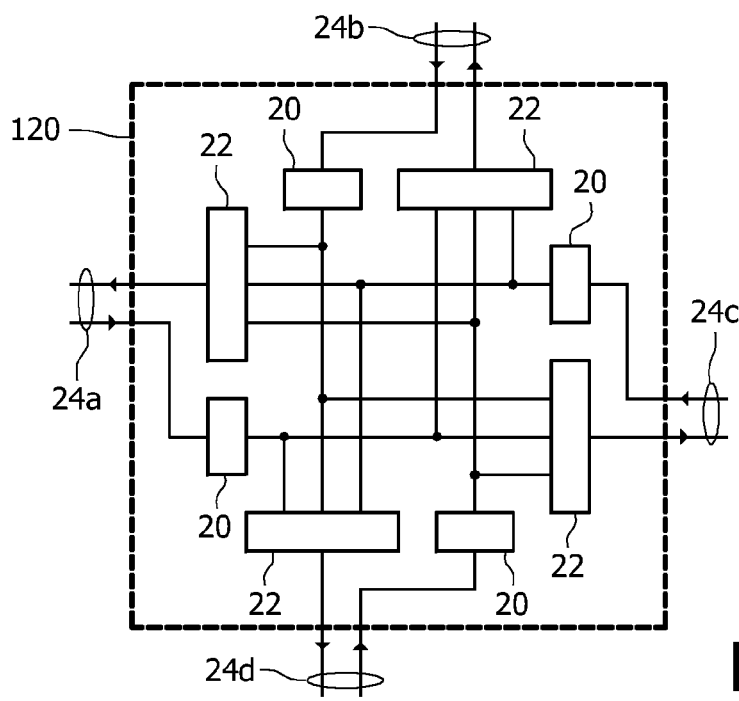
FIG. 2 shows a router circuit

FIG. 2 shows an embodiment of a router circuit 120. In this embodiment router circuit 120 comprises a plurality of buffer memories 20, and multiplexing circuits 22. The router circuit has ports 24a-d, each with an input coupled to a respective buffer memory 20 and an output coupled to an output of a respective multiplexing circuit 22. Each buffer memory 20 has outputs coupled to the multiplexing circuits 22.

In operation router circuit 120 operates in successive transmission cycles. In each transmission cycle each buffer memory 20 receives and stores a data item (if any) from a respective port 24a-d. In the next transmission cycle each multiplexing circuit 22 outputs to its associated output a data item that was stored into a respective selected one of the buffer memories 20 in the previous transmission cycle. Selection of the buffer memory 20 by multiplexing circuits 22 is controlled by routing information in the data items in the buffer memories 20.

Typically, each data item contains a predetermined number of control bits at a predetermined location to indicate the port 24a-d to which the data item should be transmitted and the multiplexing circuits 22 are designed to respond to these control bits accordingly. Preferably, the multiplexing circuits 22 are also arranged to update the data items so that the control bits for a next router circuit 120 are moved to the predetermined location in the data item that is used by the next router circuit 120. The control bits are typically inserted in the data item by network interfaces 14.

Figure 3:
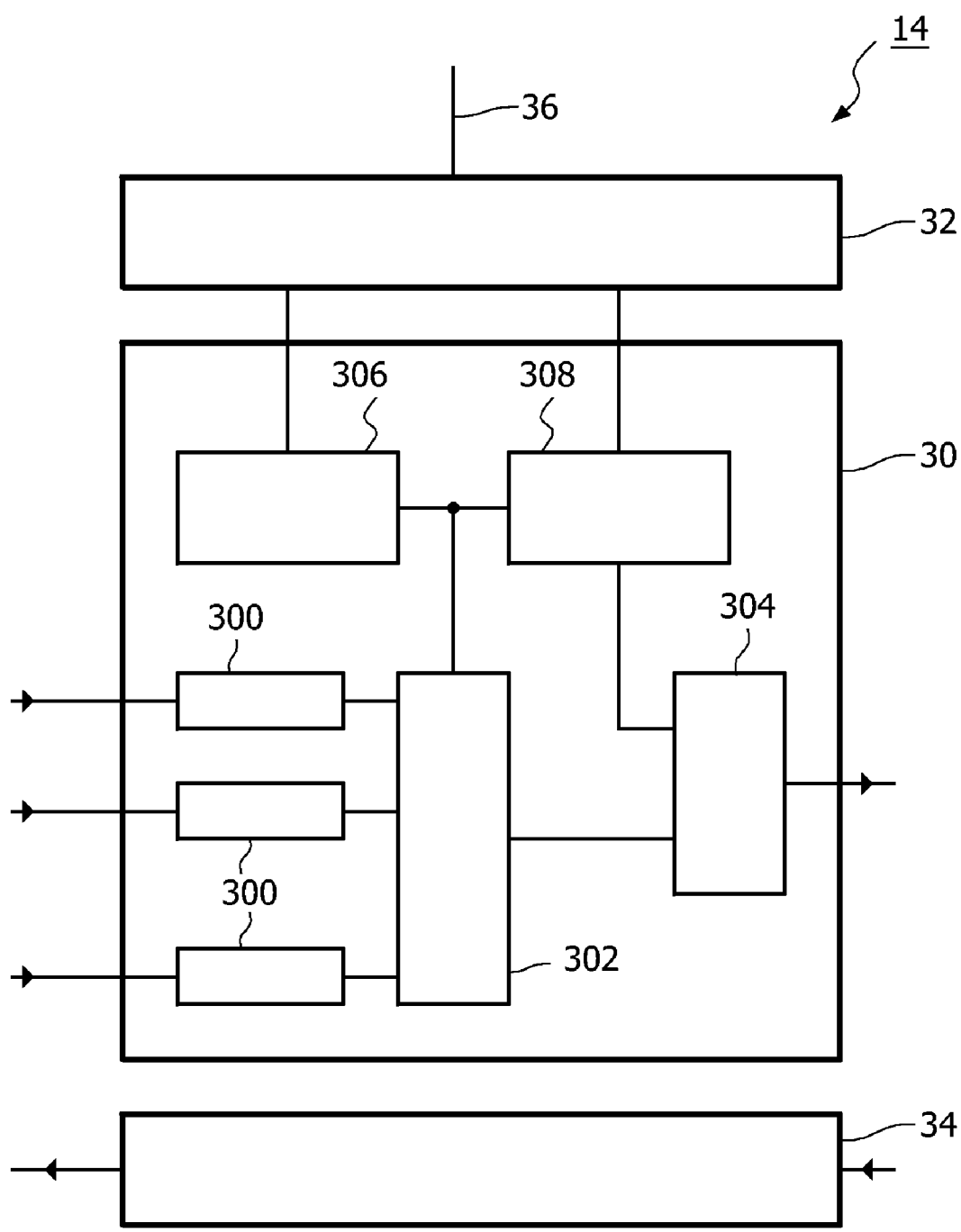
FIG. 3 shows a network interface

FIG. 3 shows an embodiment of network interface 14. In this embodiment network interface 14 comprises an input part 30 with a plurality of input buffer queue memories 300, a queue multiplexer 302, a routing information multiplexer 304, a slot table memory 306 and a connection table memory 308. Furthermore, network interface comprises a control unit 32, an output unit 34 and a connection 36 for connection to scheduling circuit 16 (not shown).

Input buffer queue memories 300 have inputs coupled to the data processing circuit (not shown) that is associated with the network interface and outputs coupled to queue multiplexer 302. Queue multiplexer 302 has an output coupled to a first input of routing information multiplexer 304, which has an output coupled to a router circuit (not shown) of the on-chip communication network (not shown). Slot table memory 306 has an output coupled to a control input of queue multiplexer 302 and an input of connection table memory 308. Connection table memory 308 has an output coupled to a second input of routing information multiplexer 304.

In operation the data processing circuit (not shown) that is associated with the network interface supplies data to the input buffer queue memories 300, which serve to realize a first in first out buffer. Transmission of buffered data by the network interface takes place in transmission cycles. The network interface defines repeating network periods. Each network period comprises a plurality of successive transmission cycles. Sets of transmission cycles at the network period from one another are called a slot. Slot table memory 306 comprises memory locations for respective slots, each memory location stores queue selection information that represents the input buffer queue memory 300 associated with the slot. In successive transmission cycles the network interface causes slot table memory 306 to output the queue selection information according to respective slots to which the successive transmission cycles belong.

In a transmission cycle the queue selection information controls queue multiplexer 302 to pass data from the input buffer queue memory 300 for the selected queue of the slot to which the transmission cycle belongs. The queue selection information controls connection table memory 308 to output routing information for the slot to which the transmission cycle belongs. This routing information is supplied to routing information multiplexer 304, which outputs this routing information together with the data from the input buffer queue memory 300. The routing information and the data from the input buffer queue memory 300 are supplied to the first router in the network (not shown).

It should be realized that the embodiment of FIG. 3 only shows the organizational structure of the input part of network interface 14 and that only very schematically. In practice the network interface may contain a processor (not shown) with a memory to perform any or all of the described functions. For example slot table memory 306 and connection table memory 308 may implemented using different location in the same memory, which is addressed to retrieve the required information. As another example, the multiplexing functions may be realized by selective retrieval from a memory. Moreover, dependent on the implementation, the data from input buffer queue memories 300 may be transmitted in serial with the routing information (in which case a transmission cycle comprises a plurality of data cycles) or in parallel. Accordingly routing information multiplexer 304 may be arranged to transmit the routing information in one data cycle and the queued data in one or more other data cycles, or in parallel with the queued data in the same data cycle.

If only one data stream needs to be realized at a time, a single input buffer queue memory 300 suffices and no queue multiplexer 302 is needed. Even if more than one stream may be used a single queue memory may be used, the multiplexer reading data for selected queues in different slots.

Output unit 34 receives data from the network (not shown) and passes this data to the associated data processing circuit of network interface 14, if desired after buffering.

Control unit 32 receives passes requests from the associated data processing circuit of network interface 14 to the scheduling circuit (not shown) via connection 36. The requests include requests to set up connections through network 12 to selected destination for an indefinite number of network periods, or to tear down such connections. The scheduling circuit returns information to indicate whether the request has been granted. Furthermore, scheduling circuit 16 writes information into slot table memory 306 and/or connection table memory 38, as required for the operation of the integrated circuit. Scheduling circuit 16 may be implemented for example as a programmed data processing circuit programmed with a program to handle requests.

Output unit 34 typically contains a FIFO buffer (not shown) for buffering received data. In an embodiment two-way streams may be realized between pairs of network interfaces. Optionally this may be used to implement a credit based stream control, wherein the data receiving network interface 14 sends back credit information that indicates how much received data items have been processed so far that they no longer need buffer space in the network interface and the data sending interface suspends transmission if the number of data items that has been sent and the credit information that has been received back does not guarantee that buffer space is available at the receiving end. In this case a coupling (not shown) between input unit 30 and output unit 34 is typically provided for feeding back the received credit information.

Figure 4:
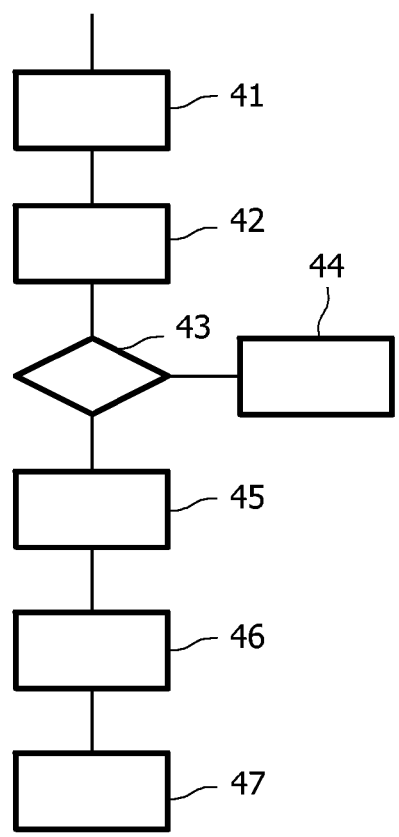
FIGS. 4, 4a show flow charts of a scheduling process

FIG. 4 shows a flow-chart of the operation of scheduling circuit 16 to handle a request to set up a connection for a real time stream for an indefinite number of network periods. In a first step 41 the request is received. Typically, the request specifies the source and destination of the stream (i.e. the network interface to which the stream should be sent) and optionally also the required bandwidth and a maximum transmission latency, but the latter two may also be implied at standard values by default.

In a second step 42 scheduling circuit 16 performs a search for a set of channels through communication network 12 that will satisfy the request as well as support data streams that have been established earlier. Each channel involves a path through the network, that is, a series of connections 122 between router circuits 120, and slots in which these connections 122 will be used.

FIG. 5a illustrates the occupation of connections 122 and slots by a channel. Different rows (a, b, c . . . ) correspond to different connections 122 and different columns (0, 1, 2, . . . ) correspond to temporally successive transmission cycles. Crosses indicate the transmission cycles in which a connection 122 is occupied by the channel. In the Fig. a network period of eight transmission cycles has been assumed. Thus a slot contains transmission cycles that repeat each eight transmission cycles. Accordingly, the pattern of crosses repeats every eight transmission cycles in this illustration. The numbers that distinguish the columns identify the slots.

The pattern will be such that connections 122 that are occupied in successive slots will be connected to a shared router circuit 120. In FIG. 5a network connections 122 that connect to a shared router circuit 120 are not necessarily always represented by successive rows, so that vertical jumps may occur in the pattern. FIG. 5b illustrates the connections 122 occupied by the channel, with number indicating the slots in which the connections are occupied.

FIG. 5c illustrates occupation of slots and connections 122 for a combination of three channels, indicated by crosses, circles and squares. FIG. 5d illustrates the connections occupied by these channels.

Typically, when scheduling circuit 16 receives a request for opening a new channel, slots and connections 122 will have been allocated for a number of previously requested channels and these slot and connections will be in use for transmitting data streams through these channels. When scheduling circuit 16 receives a request to add a channel scheduling circuit 16 searches for slots and connections 122 for realizing that channel.

According to the invention scheduling circuit 16 this search is not limited to allocations of slots and network connections 122 that leave previously allocations of slots and network connections 122 for previously existing channels unmodified. Scheduling circuit 16 also considers modifying the slots and/or network connections 122 for the existing channels in a way that does not disturb data transmission over these channels.

In a first embodiment scheduling circuit 16 does not consider modifying the slots in which network connections are occupied for respective existing channels, but searches in the set of all equal length paths for each existing channel, the paths involving respective, different series of connections between the same source and destination of the channel.

FIG. 6a-c illustrate different paths of this type. If a plurality of channels, labeled "i" (i=0, 1, . . . ) has previously been allocated, and $N_i$ alternative paths of this type exist for a channel i, then there are $N=N_0 \times N_1 \times N_2 \times \ldots$ different combinations of paths for these existing channels i. When handling a request for setting up a new channel scheduling circuit 16 considers all paths for that new channel that satisfy the required latency (i.e. that do not require more than a predetermined number of transmission cycles to transmit data from the source to the destination). If there are M such paths than there are N×M different combinations of paths for the existing channels plus the new channels.

For each of the N×M different combinations scheduling circuit 16 considers P different starting time slots for the requested new channel (P being the number of transmission cycles in a network period). In this embodiment scheduling circuit 16 only considers the previous starting time slots for the existing channels. Of the N×M combinations for P different starting slots scheduling circuit 16 can eliminate those combinations where different channels use a same network connection 122 in a same slot. Scheduling circuit 16 selects one of the remaining combinations.

In principle search step 42 may be implemented in that scheduling circuit visits each of the N×M×P possible combinations with one of the time slots successively until a combination has been found wherein no network connection 122 is used more than once in the same slot.

Figure 4A:
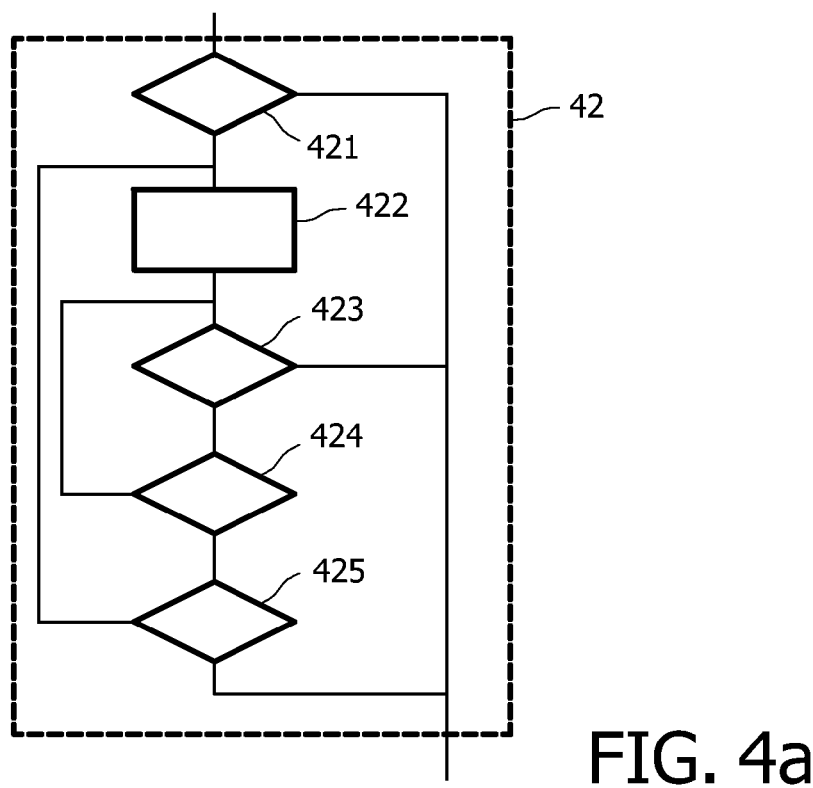

FIG. 4a shows an embodiment wherein the search step 42 for example starts with a first search sub-step 421 for generating new combinations from the combination of network connections for the existing channels. In this first search sub-step 421 scheduling circuit 16 first considers for all M possible paths and P possible starting slots for the requested channel whether there is at least one of the M paths for at least one of the P starting points so that its combination with the existing paths will use no network connection 122 more than once in the same slot. If such a path and starting slot exists the search step terminates after this first search sub-step.

If such a path and starting point cannot be found a second sub-step 422 is executed wherein scheduling circuit selects an existing channel that uses a network connection 122 that is part of at least one of the M possible paths for the requested channel. Next scheduling circuit 16 selects a combination of paths for the requested channel and the existing channels wherein the selected existing channel runs along a different path than before and the remaining channels run along the same path as before. A possible starting slot is selected for the requested channel. In a third search sub step 423 scheduling circuit 16 tests whether the selected combination uses no network connection 122 more than once in the same slot. If so the search step terminates.

If the selected combination makes conflicting use of a connection scheduling circuit 16 executes a fourth sub-step 424 to select another possible combinations of paths for the requested channel and the existing channels, wherein the selected existing channel runs along a different path and the remaining channels run along the same path as before. If necessary, third search sub-step 423 is repeated until all M×$N_i$ possible combinations of paths for the requested channel (M) and the selected channel ($N_i$) and P possible starting slots for the requested channel have been considered. Otherwise, a fifth sub step 425 causes a repetition of second sub-step 422 to select another existing channel for rerouting.

If a suitable combination of paths and a starting point cannot be found, a failure to satisfy the request is reported. Optionally, further search sub-steps may be executed wherein scheduling circuit 16 considers alternative paths simultaneously for sub-sets of two existing channels and greater numbers of existing channels respectively. Preferably scheduling circuit selects these sub-sets of existing channels so that they are related in the sense that at least one of the existing channels in the sub-set uses a network connection 122 that is part of the M possible paths for the newly requested connection and each next existing channel in the sub-set uses a network connection 122 that is part of the M possible paths or used by a previous existing channel in the sub-set.

Dependent on the acceptable complexity of scheduling circuit 16 search step 42 may be limited to a limited number of such search sub-steps.

Preferably, the search is limited to rerouted paths that ensure that throughput a guarantee for the channel remains met. In one example, the throughput guarantee can be expressed as a maximum delay D of a number of time slots that may be added due to rerouting (D=0 for example). The actual delay for a rerouted path is $$dS+dL$$

Herein dS is the distance S1-S0 between the first unused time-slot S0 according to the original path and the first used time slot S1 according to the rerouted path. dL is the difference in length (number of connections 122) L1-L0 between the length of the original path L0 and of the rerouted path L1. Preferably only paths and time slots are considered during the search that meet the condition that dS+dL is equal to or smaller than D. In a typical example D equals zero and if dS also equals zero dL should accordingly be zero or smaller than zero. If dS>0 a smaller dL should be used.

After search step 42 scheduling circuit 16 executes a third step 43. Third step 43 tests whether a valid combination has been found. If not, third sub-step passes control to a fourth step 44, sending back a refusal to the requesting network interface if no suitable path has been found for the newly requested channel.

If a suitable path has been found in search step 42 scheduling circuit 16 moves to a fifth step 45, wherein scheduling circuit 16 sends commands to those network interfaces 14 at the start of existing channels for which an alternative path has been selected in search sub-step. The commands control updates to the connection table memory 308 or memories 308 of the network interfaces 14 that are involved. In the connection table memory 308 or memories new routing information is written that defines the alternative path. For example, if scheduling circuit 16 has found a combination of paths in the first search sub-step described above, a command is sent to the network interface at the start of the selected existing channel to update the routing information for that channel.

Subsequently scheduling circuit 16 executes a sixth step 46 wherein scheduling circuit 16 programs routing information to connection table memory 308 of the network interface 14 at the start of the newly requested channel. Furthermore scheduling circuit 16 programs an identification of the selected slot of the newly requested channel to slot table memory 306 of the network interface.

In a seventh step 47 scheduling circuit 16 sends an acknowledge signal to control unit 32 of the network interface at the start of the newly requested channel. In response to the acknowledge signal control unit 32 signals to the data processing circuit 10 that the request is accepted and that the stream can start. Subsequently network interface 14 will send data with the routing information in the slot that has been indicated by scheduling circuit 16 and router circuits 120 will route the data through communication network 12 according to the routing information.

In an embodiment, a delay is used between rerouting of existing channels and activation of the new channel, so that the new channel starts only once all data for existing channels in communication network follows the new routes, or at least that no data that could collide with the new channel still follows the old route. When more than one channel is rerouted at the same time it may be necessary to synchronize rerouting, or to search for a series of steps in which the channels are rerouted one by one so as to avoid collisions during rerouting.

Alternatively, an acknowledgment mechanism may be used, for example by arranging the network interfaces 14 to supply an acknowledgement to scheduling circuit 16 after reception of a data item that has been marked to be a first data item after rerouting. In this case the scheduling circuit 16 activates the new channel after acknowledgments have been detected for all rerouted channels. The acknowledgement can be supplied for example by setting a flag at a predetermined memory location in the network interface 14, the scheduling circuit polling the flag or flags in the network interfaces at the end of the rerouted channel or channels. Alternatively the network interfaces may send acknowledgments. Instead of the scheduling circuit 16 some other circuit may be provided to check whether the acknowledgements have been generated and to trigger the start of the new channel. Although the invention has been illustrated for simple examples it will be appreciated that the invention is not limited to these examples. For example it should be appreciated that the invention may be applied to any pattern of connections 122 in the communication network 12. Typically each possible network allows a plurality of different paths through a plurality of routers for channels between at least part of the network interfaces. Furthermore, the invention is of course not limited to four terminal router circuits 120. Router circuits 120 with fewer or more terminals may be used. Furthermore, although it is preferred to use very simple router circuits that forward received data in the transmission cycle immediately after the transmission cycle in which the data was received, it should be appreciated that more complex router circuits may be used, for example router circuits that provide for buffering during a selectable number of transmission cycles. In this case the search also involves different buffering periods for the router circuits 120 and the routing information involves an indication of requested buffering periods for respective router circuits 120.

Furthermore, in each of the examples one slot was used for each channel, so that one transmission cycle will be used for the channel in each network period. However, if a greater transmission bandwidth is required a greater number of slots may be used. In this case the search may involve a greater number of slots, e.g. P(P−1) pairs of slots if two slots are used instead of one slot. In this case the same queue selection is written into entries for different slots in slot table memory 306. Preferably the same paths are used for transmission in both slots as this ensures in order delivery of data. An advantage of searching for alternative paths for existing channels with the same length as existing channels is that the resulting alternative paths will not affect the order in which data is delivered in this case.

Alternatively, different paths may be used for the same channel in different slots. In this case routing information that identify different paths for different slots must be written into connection table memory 308 and connection table memory 308 must be addressed according to the active slot (not according to the channel). This increases the possibility of finding suitable paths. In this case preferably equal length paths are used as this ensures in order delivery of data. But alternatively different length paths may be used, as long as the distance between the slots of is made at least sufficiently large to prevent out of order delivery of data.

In a further embodiment the search in search step 42 also involves alternative paths for existing channels that may have a length that differs from the original path, i.e. that may contain a different number of connections, preferably under the restraint that the throughput requirement remains met (dS+dL equal to or smaller than D, D=0 for example) A change of path length dL entails a risk that data will arrive out of order at the network interface of the destination. If a channel uses only one slot per network period this risk will be avoided if new path is not more than a network period P minus one connections shorter than the original path. Therefore, scheduling circuit 16 preferably restricts the search for path accordingly. When the channel involves more than one slot per network period the change in path length is preferably not shorter by more than the slot distance to the previous slot for the same channel.

However, it is not necessary to impose such restrictions if network interfaces 14 if it is possible to leave one or more slots for the changed channel unused, i.e. to suspend the channel, before starting transmission along the new channel, to ensure that all previously sent data has arrived before the first data arrives along the new path. Suspension may be realized for example by replacement of the information in the network interface that would lead to the undesired transmission before the transmission occurs, so as to prevent transmission and subsequent rewriting. But other mechanisms may be used, such as storage of further information in the network interface that explicitly indicates that certain information should not (yet) be used to start a transmission. Furthermore, a buffer (not shown) may be used in a network interface to buffer received data from the network before delivery to the data processing circuit 10. As long as sufficient buffered data is available, the unused slots will have no effect on delivery. The availability of buffered received data relaxes the throughput requirement (increases D).

Of course, this technique is only possible if the maximum allowable latency for the channel is not exceeded by adding the suspension period. Problems with the allowable latency are avoided by restricting the lengths of the changed paths so that no out of order delivery is possible, as described above. In this case, transmission of the data can be continued without suspension.

In a further embodiment the search in search step 42 also involves alternative paths for existing channels that are longer than the existing path, but not longer than allowed by the maximum allowable latency. Combined with the embodiment wherein the paths for a channel are the same for all starting slots of the channel this has the advantage that in order delivery remains ensured during the change of path.

FIGS. 7a-c illustrate some of the additional paths that may be considered in this way. The effect of this further embodiment is that more paths will be considered during the search so that there is a better chance of finding a path for the newly requested channel. In combination with the embodiment with the first search sub-step wherein alternative paths are considered for a selected existing connection, there will be $M_i > N_i$ alternative paths. But otherwise the search can be performed in a similar way.

As described even shorter paths may be considered without suspension, provided that the shortening realized by the alternative path does not exceed the distance to the nearest previous slot. This avoids out of order delivery during the change of path. In an alternative embodiment consideration of alternative paths with different length compared to existing path may be coupled to corresponding changes in the starting slots of transmission form the network interface, so that the slot of delivery remains the same, or at least does not advance so much that it moves in advance of the last slot for delivery before the change of path.

In more complicated embodiments more freedom may be allowed in the search, by considering more alternative paths and/or alternative starting time slots for existing channels and subsequently eliminating combinations of path and slots that would result in out of order delivery when the paths are changed.

Although preferably all channels are selected by scheduling circuit 16, it will be appreciated that at least initially some of the channels may use predefined paths that have been selected during design of the integrated circuit. In this case, scheduling circuit 16 need only provide for additional channels that must be added at run-time. In an embodiment all initially defined channels may be rerouted to realize a new channel, bit alternatively some channels may be excluded from rerouting, for example because a non-programmable network interface is used for those channels.

As will be appreciated by now the invention provides for an improved mechanism for the run-time addition of channels for real time streams of data through a communication network in an integrated circuit. A scheduling circuit 16 that manages all channels through the network searches for an available path and slot or slots for transmission of data for the channel from a network interface. The scheduling circuit 16 searches for the path and slots not only by looking for connections in slots that are not yet in use by existing connections, but also for connections and slots that can be made available by rerouting existing connections via alternative paths. The alternative paths are preferably selected so that the rerouting will not disturb the order of delivery of data through the channel. If suitable paths are found the existing channels are first rerouted and subsequently the new channel is created.

The invention claimed is:

1. An integrated circuit comprising:
a plurality of data processing circuits;
a communication network, coupled between the data processing circuits, the communication network comprising connections and router circuits coupled between the connections, the communication network and/or the data processing circuits and/or further circuits in between the communication network and the data processing circuits being programmable to store definitions, for respective data streams, of respective paths along the connections, for controlling the router circuits to transmit each data item from each respective data stream along the respective path programmed for that respective data stream;
a scheduling circuit coupled to the communication network, and/or the data processing circuits and/or the further circuits, for selecting and programming the respective paths, the scheduling circuit being arranged to service a request for adding an additional data stream to a plurality of original data streams after transmission of the original data streams has started, by rerouting the path or paths for at least one of the original data streams and selecting for the new data stream a new path that occupies a connection vacated by said rerouting of the path or paths for the at least one of the original data streams, and reprogramming the definition of the path or paths of the original data stream and programming the definition of the new path, without interrupting transmission of data items for original data streams other than said at least one of the original data streams.

2. The integrated circuit according to claim 1, wherein the scheduling circuit is arranged to allocate the connections to the respective data streams in selected time slots, the original data streams occupying the connections in the paths in a periodically repeating pattern of slots, the scheduling circuit being arranged to leave use of the slots in the pattern uninterrupted for original data streams other than said at least one of the original data streams, when the new path is started.

3. The integrated circuit according to claim 2, wherein the router circuits are arranged to forward received data items along the paths with predetermined delays after reception, so that a starting time slot in which the data item enters the network determines the time-slots wherein a data item occupies respective connections.

4. The integrated circuit according to claim 2, comprising network interfaces, each coupled to a respective one or group of the data processing circuits, each network interface comprising a memory for storing at least one of the definitions, the network interfaces being arranged to include routing information derived from the stored definitions in their respective memories into data items that include data from the data streams, the router circuits being arranged to route each data item under control of the routing information, the scheduling circuit being arranged to implement the new path by programming a new definition into the memory of the network interface at a start of the new path, and to replace the stored one or more definitions according to rerouted path or paths for the at least one of the data streams in the network interface at a start or starts of that rerouted path or paths, the network interface activating the new path after programming and reprogramming of the definitions.

5. The integrated circuit according to claim 2, wherein the scheduling circuit is arranged to select a combination of paths for the original data streams and the new data stream from selectable combinations that are defined by the arrangement of the scheduling circuit, the selectable combinations including only combinations wherein the rerouted path or paths for the at least one of the original data streams has or have a same length as the initial path for the at least one of the original data streams.

6. The integrated circuit according to claim 2, wherein the scheduling circuit is arranged to select a combination of paths for the original data streams and the new data stream from selectable combinations that are defined by the arrangement of the scheduling circuit, the selectable combinations including no combinations wherein the rerouted path for the at least one of the original data streams is shorter than the initial path for the at least one of the original data streams.

7. The integrated circuit according to claim 2, wherein the scheduling circuit is arranged to select a combination of paths for the original data streams and the new data stream from selectable combinations that are defined by the arrangement of the scheduling circuit, the selectable combinations including combinations wherein the rerouted paths for the at least one of the original data streams are shorter than the initial paths, the scheduling circuit being arranged to cause the communication network to insert a pause in the periodically repeating pattern for the at least one of the original data streams wherein a last starting slot in which the initial path for the at least one of the original data streams pertains remains unoccupied before a first starting slot using the rerouted path for the at least one of the original data streams is used.

8. The integrated circuit according to claim 2, wherein the scheduling circuit is arranged to select a combination of paths for the original data streams and the new data stream from selectable combinations that are defined by the arrangement of the scheduling circuits, the selectable combinations including combinations wherein the rerouted paths for the at least one of the original data streams are shorter than the initial paths, the scheduling circuit being arranged to:
select a different position for a new starting slot for the rerouted path for at least one of the original data streams than for an initial starting slot for the initial path for that original data stream, a distance between the new starting slot and the initial starting slot being at least as large as a difference between the length of the initial path and the rerouted path;
cause the communication network to leave a last instance of the initial slot unused before transmitting a first data item in the new starting slot rerouted along the rerouted path.

9. The integrated circuit according to claim 2, wherein the scheduling circuit is arranged to select a combination of paths for the original data streams and the new data stream from selectable combinations that are defined by the arrangement of the scheduling circuit, the selectable combinations including only combinations wherein no more than one of the rerouted paths differs from the initial paths.

10. The integrated circuit according to claim 2, wherein the scheduling circuit is arranged to select a combination of paths for the original data streams and the new data stream from selectable combinations that are defined by the arrangement of the scheduling circuit, the scheduling circuit being arranged to perform a search wherein respective combinations of paths for the data streams are visited and the scheduling circuit determines whether the visited combinations involve colliding use of connections, until a combination with no colliding use is detected.

11. A method of operating an integrated circuit, wherein the integrated circuit comprises a plurality of data processing circuits and a communication network coupled between the data processing circuits, the communication network comprising connections and router circuits coupled between the connections, the communication network and/or the data processing circuits and/or further circuits in between the communication network and the data processing circuits being programmable to store definitions, for respective data streams, of respective paths along the connections, for controlling the router circuits to transmit each data item from each respective data stream along the respective path programmed for that respective data stream; the method comprising:

defining initial paths for a set of original data streams;
starting transmission of data items of the original data streams;
subsequently identifying a new path for an additional data stream, the new path being selected in combination with future paths for the original data streams, from selectable combinations that include at least one combination wherein an initial path for at least one of the original data streams has been rerouted with respect to the initial path;
reprogramming the initial path for the at least one of the original data streams if the path for that original data stream is rerouted in the selected combination, without interrupting transmission of data items of data streams other than the at least one of the original data streams;
subsequently starting transmission of data items along the new path.

12. The method according to claim 11, comprising time-slot multiplexing the connections for the data streams, the original data streams occupying the connections in the initial paths in a periodically repeating pattern of slots, the pattern being continued without interruption during addition of the new path, for least those of the original data streams that are also part of the selected combination.

13. The method according to claim 12, wherein a combination of paths for the original data streams and the new data stream is selected from a predefined set of selectable combinations, the predefined set including only combinations wherein the rerouted path or paths for the at least one of the original data streams has or have a same length as the initial path for the at least one of the original data streams.

14. The method according to claim 12, wherein a combination of paths for the original data streams and the new data stream is selected from a predefined set of selectable combinations, the predefined set including no combinations wherein the rerouted path or paths for the at least one of the original data streams is or are shorter than the initial path or paths for the at least one of the original data streams.

15. The method according to claim 12, wherein a combination of paths for the original data streams and the new data stream is selected from a predefined set of selectable combinations, the predefined set including combinations wherein the rerouted paths for the at least one of the original data streams are shorter than the initial paths, a pause being inserted in the periodically repeating pattern for the at least one of the original data streams wherein a last starting slot in which the initial path for the at least one of the original data streams pertains remains unoccupied before a first starting slot using the rerouted path for the at least one of the original data streams is used.

16. The method according to claim 12, wherein a combination of paths for the original data streams and the new data stream is selected from a predefined set of selectable combinations, the predefined set including combinations wherein the rerouted paths for the at least one of the original data streams the original data streams are shorter than the initial paths:

using a different temporal position for a new starting slot for the rerouted path for at least one of the original data streams than for an initial starting slot for the initial path for that original data stream, a distance between the new starting slot and the initial starting slot being at least as large as a difference between the length of the initial path and the rerouted path;
leaving a last instance of the initial slot unused before transmitting a first data item in the new starting slot along the rerouted path.

17. The method according to claim 12, wherein a combination of paths for the original data streams and the new data stream is selected from a predefined set of selectable combinations, the predefined set including only combinations wherein no more than one of the rerouted paths differs from the initial paths.

18. A computer program product, comprising non-transitory memory storing instructions for a programmable scheduling circuit in an integrated circuit that comprises a plurality of data processing circuit and a communication network coupled between the processing circuits, the communication network comprising connections and router circuits coupled between the connections, the communication network and/or the data processing circuits and/or further circuits in between the communication network and the data processing circuits being programmable to store definitions, for respective data streams, of respective paths along the connections, for controlling the router circuits to transmit each data item from each respective data stream along the respective path programmed for that respective data stream, the instructions stored in said non-transitory memory, when executed by the programmable scheduling circuit, causing the programmable scheduling circuit to perform: identify a new path for an additional data stream after transmission of the data streams through a plurality of original data streams has started, the new path being selected in combination with future paths for the original data streams, from possible combinations that include at least one combination wherein the future path for at least one of the original data streams is a rerouted path; cause the communication network to reroute the initial path for the at least one of the original data streams, without interrupting transmission of data items along at least those of the initial paths that are also part of the selected combination, and subsequently to start transmission of data items along the new path.

* * * * *